United States Patent Office 3,183,213
Patented May 11, 1965

3,183,213
CATALYTIC POLYMERIZATION OF ALDEHYDES USING AN ALKALI METAL THIOCYANATE CATALYST
Otto Ernst van Lohuizen, Arnhem, and Geert de Vries, Delft, Netherlands, assignors to Algemene Kunstzijde Unie N.V., Arnhem, Netherlands, a corporation of the Netherlands
No Drawing. Filed Oct. 9, 1961, Ser. No. 143,551
Claims priority, application Netherlands, Oct. 24, 1960, 257,184
10 Claims. (Cl. 260—67)

The present invention relates to an improved process for the polymerization of aldehydes, and more particularly relates to a method for the catalytic polymerization of aldehydes.

It is already well known that aldehydes may be converted into high-molecular products by catalytic polymerization, and that the resulting polyaldehydes, particularly polyformaldehyde, may be successfully utilized for a variety of applications in the plastic field. For example, the so-called eupolyoxymethylenes can be formed into clear colorless shaped bodies, such as, pliable films or filaments.

A variety of compounds have been suggested in the prior art as useful as catalysts in the polymerization of aldehydes. By way of example, some of the prior art catalysts are: primary, secondary, tertiary amines, phosphines, arsines and stibines; quaternary ammonium salts, phosphonium salts and sulphonium salts; inorganic acids such as hydrochloric acid and sulfuric acid; organic metal compounds, such as cadmium dialkyls, alkyl magnesium halides, triarylbismuth compounds, metal carbonyls, metal mercaptans and alkali metal alcoholates; inorganic metal compounds such as iron salts, cobalt salts, chromium salts, metal hydrides and peroxides.

It has been found, in general, that the structure and stability of the polymers formed in the prior art catalytic polymerization processes for aldehydes is dependent upon the catalyst that is utilized in the polymerization reaction. Accordingly, it is important that the catalyst used in the polymerization process be of such a nature as to make it possible to obtain a reasonably stable end product. Moreover, it is also necessary that the catalyst be of such a nature that it can be easily removed from the polymer without any detriment to same. Also, the catalyst must not cause any undesired discoloration of the polymer. Furthermore, the reaction speed attained with the catalyst in the polymerization reaction should be such that a commercially acceptable product may be easily obtained at all times. Also, the cost of the catalyst should be such that an economical product can be easily produced on a commercial basis. The catalyst heretofore used for the polymerization of aldehydes has been found to be lacking in these properties.

In accordance with the present invention it has been found that inorganic thiocyanates are excellent catalysts for the polymerization of aldehydes, that is, they possess the above mentioned properties which are necessary for the successful polymerization of aldehydes.

An object of the present invention is to provide an improved process for the polymerization of aldehydes.

Another object for the present invention is to provide a process for the catalytic polymerization of aldehydes.

Still another object of the present invention is to provide a process for the catalytic polymerization of aldehydes whereby a stable polymer is obtained.

A further object of the present invention is to provide a process for the catalytic polymerization of aldehydes whereby the catalyst does not cause undesired discoloration of the polymer.

Still a further object of the present invention is to provide a process for the catalytic polymerization of aldehydes whereby the reaction speed obtained with the catalyst is such that a commercially acceptable product is easily obtained.

Still another object of the present invention is to provide a process for the catalytic polymerization wherein thiocyanates are used as the catalysts. Other objects and advantages of the process of the present invention will appear from the following detailed description.

The above and other objects of the present invention are realized by bringing into contact with the aldehyde to be polymerized the thiocyanate catalyst in a finely divided state. The polymerization according to this invention is expediently carried out in a medium in which the thiocyanate may be dissolved. It has been found that excellent results may be obtained when acetonitrile is used as the medium for the polymerization reaction.

In accordance with the present invention it has been found that a large number of the inorganic thiocyanates may be successfully used for application in the process of this invention, however, applicant has found that the best results may be obtained with alkali metal thiocyanates, such as, for example, lithium, sodium, potassium, rubidium and cesium thiocyanates. Optimum results have been obtained utilizing potassium thiocyanate as the polymerization catalyst.

In accordance with the process of the present invention, a variety of aldehydes may be successfully used such as; acetaldehyde, propionaldehyde, butyraldehyde, isobutyraldehyde, valeraldehyde, hexaldehyde, mono-chloracetaldehyde, dichloracetaldehyde and trichloracetaldehyde, etc. The process of the present invention is particularly important for the preparation of polyformaldehyde, i.e. (polyoxymethylene) for which a variety of applications has been found in the plastic field, that is, the polyoxymethylenes prepared can be shaped with the aid of heat and pressure to filaments, films and other shaped bodies. Moreover, the polychloral prepared in accordance with this invention is also of importance because of its favorable properties.

Furthermore, in accordance with the process of this invention substantially linear polymers may be prepared which possess excellent mechanical properties. Moreover, by adding to the mixture to be polymerized a small amount of a dialdehyde, such as glyoxaloradipaldehyde, the properties of the polymers may be radically changed because the linear molecules are cross-linked.

In the preparation of aldehyde polymers, according to the present invention, it is important that the process be started with a very pure monomer. It has been found that small amounts of impurities, e.g., as a result of decomposition of the monomer, have a very unfavorable effect on the reaction speed, the stability, and the mean molecular weight of the polymers obtained.

According to the catalytic process of the present invention, it is preferred that the thiocyanate catalyst be present in the range of 0.02 to 0.5 mole percent, calculated on the amount of aldehyde. However, the amount of catalyst may vary within wide ranges, for example, good results have been obtained using quantities of catalysts ranging from 0.001 to 2 mole percent calculated on the amount of the aldehyde.

The temperature at which the process of the present invention may take place varies within wide limits. Is is obvious that the optimum temperature depends upon the nature of the monomers utilized in the polymerization reaction. However, in many instances, it is advantageous to work at temperatures below 0° C.

It is important to point out that the molecular chains in the polymers prepared in the present invention are made up of alternating carbon and oxygen atoms, as in the case of the known polyformaldehyde, which term is used in this application to mean polyoxymethylene.

The polymers produced according to the present invention may be shaped at elevated temperatures, such as, for example, injection moulding apparatus. If desired stabilizers ageing retardants, lubricants, pigments, light protecting agents, or fillers may be incorporated in the polymers produced according to the present invention. It is also possible to incorporate powders of other polymers with the shapeable polyoxymethylene polymers, such as, for example, powdered condensation products of formaldehyde with phenol or urea. It is also possible to process such polyoxymethylene polymers together with other monomeric or polymeric vinyl or alkyl compounds or with converted natural products such as gelatin, calisein or the like.

The following examples will illustrate methods of practicing in the invention although it will be understood that the invention is not limited to the details therein given.

EXAMPLE 1

*Polychloral*

A reaction flask containing 10 milliliters of chloral, is cooled down to 0° C., said reaction flask is kept in the dark. Then, while the liquid is stirred and kept under an atmosphere of nitrogen, 17 milligrams of potassium thiocyanate and 0.5 milliliter acetonitrile are added. The polymerization is effected very rapidly. Then, after 24 hours the polymer is washed successively with pentane, water, ethanol, and diethyl ether, resulting in a 70% yield of substantially amorphous polychloral.

EXAMPLE 2

*Polyformaldehyde (polyoxymethylene)*

70 grams of alpha-polyoxymethylene is heated to 130° C. and the escaping formaldehyde is fed through 3 cooling vessels at a temperature of −20° C. into a reaction flask containing 480 milliliters of acetonitrile which has been cooled down to 0° C. Then, after the alpha-polyoxymethylene has been completely depolymerized and all of the formaldehyde formed therefrom has been dissolved in acetonitrile, 68.7 milligrams of potassium thiocyanate and one milliliter of acetonitrile are added to the contents of the flask.

The reaction mixture is stirred for 2 hours at −10° C. then the reaction product is washed with heptane. Thereafter, 42.75 grams polymer having a melting point of 172–176° C. are obtained. Then, by washing the polymers successfully with water, alcohol, and ether, the melting point becomes 172–173° C.

EXAMPLE 3

*Polyformaldehyde (polyoxymethylene)*

70 grams of alpha-polyoxymethylene is heated at a temperature of 130° C. and the formaldehyde so produced is fed through 3 cooling vessels each at a temperature of −20° C. into a reaction flask containing 480 milliliters of acetonitrile which contains 180 milligrams of the catalyst potassium thiocyanate. The temperature of the solution is cooled to 0° C. The product is filtered and the precipitate is washed with water, ethanol and ether and dried over phosphorus pentoxide in vacuo. The melting point of the polymer is 175° C.

It is to be understood that the foregoing detailed description is given merely by way of illustration and that many variations may be made therein without departing from the spirit of this invention.

What is claimed:

1. A process for the catalytic polymerization of an aldehyde selected from the group consisting of formaldehyde, acetaldehyde, propionaldehyde, butyraldehyde, isobutyraldehyde, valeraldehyde, hexaldehyde, monochloracetaldehyde, dichloracetaldehyde and trichloracetaldehyde, which comprises polymerizing said aldehyde in the presence of from about 0.001 to about 2 mol percent, based on said aldehyde, of an alkali metal thiocyanate catalyst.

2. The process according to claim 1, wherein said alkali metal is potassium.

3. The process according to claim 1, wherein the said aldehyde is formaldehyde.

4. The process according to claim 1 wherein said aldehyde is trichloracetaldehyde.

5. The process according to claim 1 wherein the amount of said alkali metal thiocyanate catalyst is in the range of from about 0.02 to about 0.5 mol percent.

6. The process according to claim 1 wherein said polymerization is carried out in an acetonitrile medium.

7. The process for the catalytic polymerization of formaldehyde which comprises polymerizing formaldehyde in the presence of from about 0.001 to about 2 mol percent, based on said formaldehyde, of a potassium thiocyanate catalyst.

8. The process according to claim 7, wherein the amount of said potassium thiocyanate catalyst is in the range of from about 0.02 to about 0.5 mol percent.

9. A process for the catalytic polymerization of trichloracetaldehyde which comprises polymerizing trichloracetaldehyde in the presence of from about 0.001 to about 2 mol percent, based on said trichloracetaldehyde, of a potassium thiocyanate catalyst.

10. The process according to claim 9 wherein the amount of said potassium thiocyanate catalyst is in the range of from about 0.02 to about 0.5 mol percent.

References Cited by the Examiner
UNITED STATES PATENTS

| | | | |
|---|---|---|---|
| 1,910,338 | 5/33 | Howald | 260—69 |
| 2,296,249 | 9/42 | Austin et al. | 260—67 |
| 2,485,071 | 10/49 | Schulze et al. | 260—67 |

OTHER REFERENCES

Riemschneider: Monatshefte für Chemie, Band 84 (1953), pages 883–887.

WILLIAM H. SHORT, *Primary Examiner.*

H. N. BURNSTEIN, *Examiner.*